June 20, 1961 H. A. PERKINS, JR 2,989,689

FEEDBACK CIRCUIT FOR HALF-WAVE AMPLIFIER

Filed July 12, 1957 2 Sheets-Sheet 1

WITNESSES

Edwin E. Bassler

Leon M. Garman

INVENTOR

Harley A. Perkins, Jr.

BY

F. E. Browder

ATTORNEY 2,989,689
Patented June 20, 1961

2,989,689

FEEDBACK CIRCUIT FOR HALF-WAVE AMPLIFIER

Harley A. Perkins, Jr., Baldwin Township, Allegheny County, Pa., assignor to Westinghouse Electric Corporation, East Pittsburgh, Pa., a corporation of Pennsylvania Filed July 12, 1957, Ser. No. 671,597
7 Claims. (Cl. 323—89)

The invention relates generally to half-wave magnetic amplifiers and more particularly to half-wave magnetic amplifiers for supplying inductive loads.

The object of the invention is to provide for a high speed of response of a half-wave magnetic amplifier when supplying an inductive load.

Other objects of the invention will, in part, be obvious and will, in part, appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

FIG. 6 is a typical hysteresis loop for silicon iron such as ordinarily used in cores for specialty transformers and the like.

In the use of half-wave magnetic amplifiers, since the gating and resetting half cycles are substantially 180° out of phase, there is no way of getting load current feedback directly to the amplifier during the reset half cycle. Self-induced voltage resulting from the load circuit flux may render control of the amplifier relatively ineffective.

In order to utilize half-wave magnetic amplifiers in supplying an inductive load, a discharge path is employed for current produced by self-induced voltage from the load. In the present invention the discharge path is provided in the form of a feedback circuit. The arrangement and functioning of the feedback circuit will be described as the specification proceeds.

Figure 1:
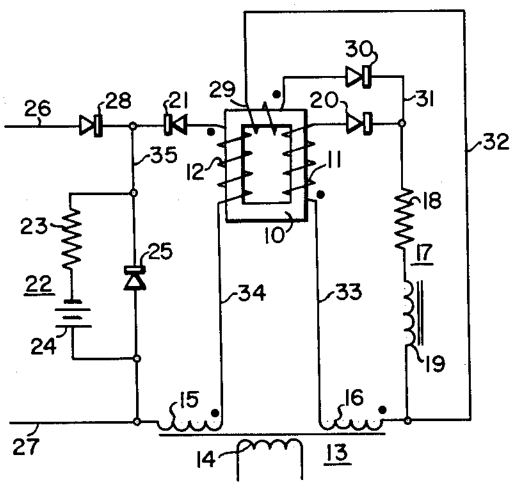
FIGURE 1 is a circuit diagram embodying the features of the invention.

Referring now to FIG. 1, the half-wave magnetic amplifier comprises a magnetic core 10 on which is mounted a gating winding 11 and a reset winding 12. The number of turns in the gating winding 11 and the reset winding 12 will depend on the conditions to be met in operation.

A source of alternating current shown generally at 13 is provided for supplying both the gating winding 11 and reset winding 12. In this particular embodiment of the invention, the source of alternating current supply is a transformer with a primary winding 14 and two secondary windings 15 and 16. The number of turns in the secondary winding 16 will depend on the average voltage that is required for the load to be supplied. The ratio of voltages supplied by windings 15 and 16 is generally about the same as the ratio of gating to resetting winding turns. This half-wave magnetic amplifier may be employed to supply an inductive load such as relays or solenoids or the like. The inductive load in FIG. 1 is shown generally at 17. It is illustrated as comprising a resistor 18 and an inductive winding 19.

One terminal of the gating winding 11 is connected to the secondary winding 16 of the source of power shown generally at 13. The other terminal of the gating winding 11 is connected to a rectifier 20. The inductive load shown generally at 17 is connected between the free terminal of the rectifier 20 and the free terminal of the secondary winding 16. The rectifier 20 controls the direction of flow of current in the gating circuit.

The reset winding 12 has one terminal connected to secondary winding 15 of the source of alternating current shown generally at 13 and the other terminal to a rectifier 21. This rectifier 21 controls the direction of flow of current in the reset winding.

A non-linear device shown generally at 22 is connected between the free terminal of the rectifier 21 and the free terminal of the secondary winding 15 of the transformer constituting the source of alternating current shown generally at 13. The non-linear device comprises a resistor 23 connected in series circuit relationship with a battery 24 and the resistor and battery connected in parallel circuit relationship with a rectifier 25.

Non-linear devices are commonly employed with circuit systems of this kind. The non-linear device is so disposed with relationship to the circuits that they permit the flow of a predetermined electric current to the coils or windings of the core members without any appreciable voltage drop, and they also protect the circuits and apparatus from excessive current flow. In the description of the circuit system herein disclosed, it will seem that the electric currents flow through the rectifiers or diodes of the non-linear device in the backward or reverse direction. However, what actually happens is that there is a reduction in the electric current flow in the forward direction. The reduction in current flow may be predetermined by design to effect the performance of functions required from the control system of which the non-linear element is a part.

Leads 26 and 27 are provided for delivering a signal to the half-wave magnetic amplifier. A rectifier 28 is connected in lead 26 to prevent back flow of current from the half-wave magnetic amplifier.

A third winding 29 is provided on the core 10. A rectifier 30 is connected in series circuit relationship with the winding 29, and the two are connected across the inductive load shown generally at 17 by means of conductors 31 and 32. Thus, we have a feedback circuit for supplying the winding 29 on the magnetic core 10. The number of turns in the winding 29 will depend on the design specifications that have to be met.

In applying the winding 29 to the core 10, it may be wound in either direction. Therefore, it may be utilized either to help or hinder the reset winding 10 in driving the core to negative saturation. In the present modification the winding is so applied that it aids the reset winding 12 in driving the core to negative saturation. In other words, the reset winding 12 and the winding 29 are cumulative in the reset operation.

In the operation of the circuit system on one-half cycle of current flow, the gating circuit will drive the core 10 toward positive saturation. On the next half cycle the reset circuit will drive the core 10 toward negative saturation.

This oscillating operation will continue unless the operation of the reset circuit is blocked. Further, as long as the gating circuit and reset circuits function to drive the core towards positive and negative saturation alternately, virtually no voltage will be built up by the gating circuit to supply the load shown generally at 17.

Assuming now that a signal is received through lead 26 and that the signal blocks the flow of current in the reset circuit, then the core will not be driven toward negative saturation. In delivering the signal it is essential that the instant for delivering the signal should coincide substantially with the beginning of the flow of current in the reset circuit and that the signal be opposed to the current in the reset circuit. In other words, the delivery of the signal should be so arranged that it will block the second half wave of the current cycle that energizes the reset circuit.

When the flow of current in the reset circuit is blocked, the core is not driven to negative saturation. Therefore, on the beginning of the first half of the cycle following the blocking of the flow of current in the reset circuit, the core 10 will stand nearly saturated in the positive sense, and as the first half of the cycle proceeds, a voltage will be built up across the load 17. Current is then supplied to the load shown generally at 17.

When the gating cycle ends, current flow continues through 17 due to energy storage, producing self-induced voltage across the inductive winding 19. This will cause current to flow in the feedback circuit. The feedback circuit extends from the lower terminal of the inductive winding 19 through conductor 32, auxiliary winding 29, rectifier 30, conductor 31 and resistor 18 back to the inductive winding. The winding 29 is so arranged on core 10 that it tends to drive the core 10 toward negative saturation. However, it does not have a sufficient number of turns to accomplish the driving of the core to negative saturation.

Figure 4:
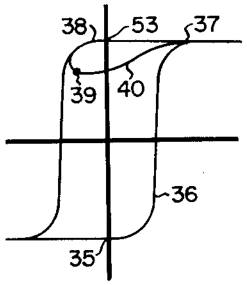
FIG. 4 shows hysteresis loop characteristics of the core of the circuit system of FIG. 1 for two conditions of operation.

At the end of each half cycle during which the gating circuit builds a voltage across the winding 11, the feedback circuit and winding 29 will produce an operation somewhat similar to that illustrated in FIG. 4. In this figure the diagram illustrating the hysteresis loop for the material utilized in core 10 is rather square in shape.

In describing what takes place in this diagram, assume that at the beginning of the half cycle of current flow in the gating circuit that drives the core to positive saturation that we start at the point 35 with the core 10 standing at negative saturation. Then as the cycle proceeds, we follow along curve 36 to point 37 when the core will stand at positive saturation. If now a signal is delivered to lead 26 which blocks the flow of current in the reset circuit on the next half cycle of current flow, then there will be no change in the saturation state of core 10 except that effected by the winding 29. The current in the circuit of the winding 29 will tend to drive the magnetic flux of the core back along the curve 38 to substantially the point 39. This point will be reached at the end of the half cycle during which the functioning of the reset circuit when not blocked by a signal causes the driving of the core to negative saturation. Therefore, at the beginning of the first part of the half cycle which drives the core to positive saturation, the start will occur at point 39 in the hysteresis loop. It will proceed along the curve 40 to point 37 from which point a buildup of load voltage will occur. The voltage built up will be applied to the load shown generally at 17.

Figure 2:
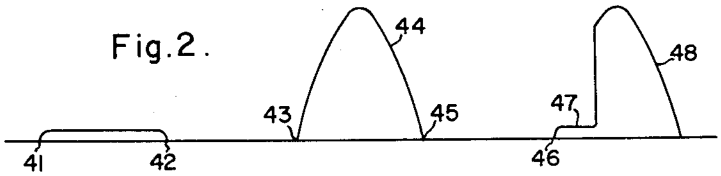
FIG. 2 is a diagram showing curves that illustrate how the voltage is built up across the load in the circuit system illustrated in FIG. 1.

With this much explanation, now refer to FIG. 2 and assume that there is negative feedback and that a signal is received which blocks the flow of current in the reset winding at rectifier 21. Then at the beginning of the first positive half wave of the cycle, that is at point 41, some current will be caused to flow in the winding 11 and the load shown generally at 17. On the next half cycle or negative half cycle, beginning at point 42, substantially no current will flow. However, at the end of the negative half cycle the core will be substantially saturated in the positive direction as indicated by the point 53 in FIG. 4. Then at the beginning of the next positive half cycle indicated at point 43, current will flow for a half cycle carrying the core to and possibly beyond point 37. Then the load voltage will build up suddenly and follow the curve 44 to point 45. On the next negative half cycle beginning on point 45 and carrying across to point 46, no current will flow. From 45 to 46 the feedback ampere turns partially resets the core, notwithstanding the fact that there is no flow of current in the reset circuit including winding 12. At the beginning of the next positive half cycle, that is at point 46, the conduction angle, that is, where the buildup of voltage begins, is chopped further, and the buildup of voltage occurs later in the half cycle.

Now since the conduction angle has been so severely chopped, as shown at 47, the feedback current to the winding 29 will be reduced. The reset of the core will not be as pronounced on the next negative half cycle, and the conduction angle will approach a value intermediate to that shown in curve 44. This will again increase the amount of feedback current, and the conduction angle will again be chopped, but not as seriously as shown at 47. This movement of the conduction angle back and forth will continue for a few cycles, but will then settle at some place between that shown in curves 44 and 48.

The inherent half cycle response of the amplifier makes possible a frequency dividing process in the amplifier. If enough feedback current is provided, the output drops to zero due to full load current of the preceding gating half cycle. When the output is zero, no feedback occurs as a result of the gating half cycle. Therefore, the output is maximum in the next half cycle. A pulse train may be produced for a current supply frequency of 30 or any other submultiple number of cycles with a 60-cycle supply frequency. It has been found with this system having a negative feedback connection that the applied average voltage can be made large as for example a voltage represented by point 49 on the curve 50 of FIG. 3, and this will establish current quickly on the average as indicated by curve 51. However, the average current will be reduced as a result of the feedback current to winding 29 as load is developed. The load current may safely be reduced to about 80% of that value normally required for the particular load to be actuated.

If the load shown generally at 19 is a relay, the high voltage will effect its almost instant operation to circuit closing position. After the relay has been actuated, it may readily be held in closed position by a current flow of 80% of that required to effect the closing operation.

Figure 3:
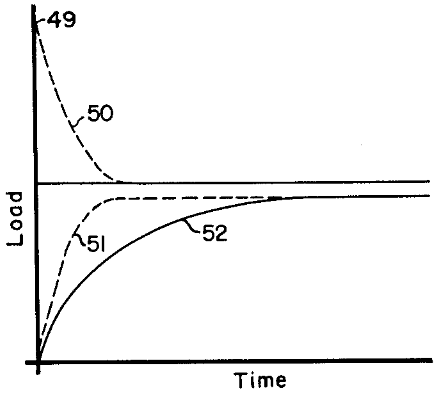
FIG. 3 is a diagram of curves illustrating how the voltage and current changes on the average in the circuit system illustrated in FIG. 1.

Some appreciation of the quick establishment of a high current may be obtained by reference to the curves 51 and 52 of FIG. 3. Curve 52 represents the development of current that would normally be effected without the feedback winding 29. The dotted line 51 shows how the current to the load will be developed quickly to effect a quick operation of a relay when there is a feedback current.

When a circuit of this kind is employed to operate relays, solenoids and the like, a quicker response is effected. It is true that a higher voltage and a larger current flow will occur initially, but the high voltage and current will be only a temporary condition. The voltage will drop, and the current flow will be reduced to safe values for such apparatus.

A circuit system of this type has a distinct advantage in the small number of components employed for building the amplifier. When the number of components are reduced, economy in cost and maintenance cost will be effected.

Figure 5:
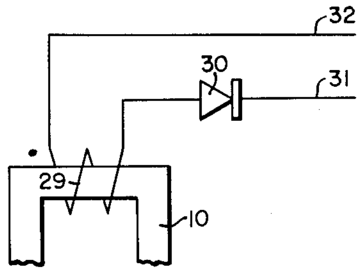
FIG. 5 is a circuit diagram showing how the circuit system illustrated in FIG. 1 is modified to make the feedback circuit cumulative with the gating circuit.

In the description given hereinbefore, the winding 29 was so applied that it was cumulative with the reset winding 12. As shown in FIG. 5, the winding 29 is applied to be cumulative with the gating winding 11. When the winding is applied in the manner shown in FIG. 5, the functioning of the magnetic amplifier is somewhat different from that illustrated in FIGS. 2 and 4.

Assume now that at the beginning of the half-cycle of current flow in the gating circuit that drives the core to positive saturation that the start is at the point 54 with the core standing near negative saturation. Then, as the cycle proceeds, the saturation moves along the curve 55 to the point 56 when the core 10 will stand at positive saturation. Assuming now that a signal is delivered which blocks the flow of current in the reset winding 12, then on the next half-cycle of current flow, the result will be a change in the flux state of the core 10 to the point 58 whereupon no further change will occur during this half cycle. This point 58 will be reached soon after the end of the half-cycle during which current is flowing through winding 11. When the normal gating half-cycle begins again, the flux buildup will start at the point 58 on the hysteresis loop and follow the curve 59 to and beyond the point 56, from which point a buildup of load voltage will occur. The voltage developed will be applied to the load shown generally at 17.

Figure 7:
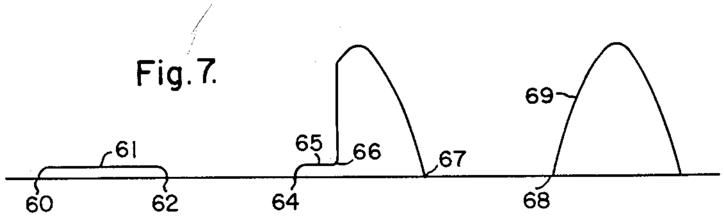
FIG. 7 is a diagram of curves illustrating how the current and voltage changes on the average in the circuit system illustrated in FIG. 5.

Referring now to FIG. 7 and assuming that there is a positive feedback and that a signal is received which blocks the flow of current in the reset winding at rectifier 21, then at the beginning of the first positive half-cycle, for instance, at point 60, some current will flow in the gating winding 11 and the load shown generally at 17, as represented by the curve 61. On the next half-cycle or negative half-cycle beginning at the point 62, substantially no current will flow. The input signal blocks reset during this period. At the end of the negative half-cycle the core 10 will be near saturation in the positive direction as indicated by the point 58 in FIG. 6. Now on the next positive half-cycle beginning at point 64, current will flow for a half-cycle carrying the core to and beyond point 56. As shown by the portion 65 of the curve, some current will begin to flow at 64, and at point 66 the voltage will suddenly build up. In this instance, the chopping of the conduction angle is fairly great.

Figure 6:
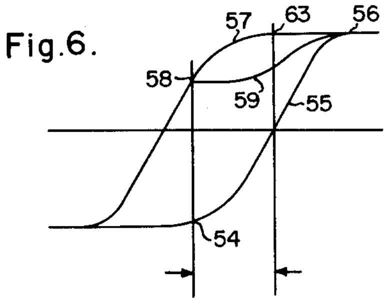

When the positive half-cycle is completed, no current will flow on the next half-cycle or resetting half-cycle, but when point 68 is reached, which is the beginning of the next positive half-cycle, the current will be back to normal, and there will be no chopping of the conduction angle. The full output shown by the curve 69 results from the action of winding 29. Load current resulting from the inductive load circulates during the reset half-cycle through conductor 32, winding 29, rectifier 30 and conductor 31. The product of this current and the turns of winding 29 holds the magnetic state of the core to a saturation level not lower than the point 63. Since no appreciable change of flux occurs between points 63 and 56, virtually no voltage will be dropped across the gating winding 11. Nearly all of the voltage will be dropped across the load reduced somewhat by winding resistance of coil 29 and the forward drop across rectifier 30. In this way the normally poor output of an amplifier utilizing a magnetic core having a hysteresis loop as shown in FIG. 6 can be improved to be similar to that which might be obtained with a more nearly square hysteresis loop.

Since certain changes will be made in the above construction and different embodiments of the invention could be made without departing from the scope thereof, it is intended that all matter contained in the above description or shown in the accompanying drawing shall be interpreted as illustrative and not in a limiting sense.

I claim as my invention:

1. A magnetic amplifier, comprising; a saturable magnetic core; a gating circuit adapted to drive said core toward saturation; a reset circuit adapted to drive said core away from saturation; signal means for blocking said reset circuit from driving said core away from saturation; means connecting an inductive load to said gating circuit; a feedback circuit for said magnetic amplifier being operative to cooperatively control the flux in said core only in response to current flow from energy storage in said inductive load.

2. A magnetic amplifier, comprising; a saturable magnetic core; a gating circuit adapted to drive said core toward saturation; a reset circuit adapted to drive said core away from saturation; signal means for blocking said reset circuit from driving said core away from saturation; means connecting an inductive load to said gating circuit; a feedback circuit for said magnetic amplifier being operative to cooperatively control the flux in said core only in response to current flow from energy storage in said inductive load; said feedback circuit being connected across said inductive load.

3. A magnetic amplifier, comprising; a saturable magnetic core; a gating circuit adapted to drive said core toward saturation; said gating circuit comprising a gating winding inductively disposed upon said core and serially connected with a rectifier and means providing a first source of alternating voltage; a reset circuit adapted to drive said core away from saturation; signal means for blocking said reset circuit from driving said core away from saturation; means connecting an inductive load to said gating circuit; a feedback circuit for said magnetic amplifier being operative to cooperatively control the flux in said core only in response to current flow from energy storage in said inductive load; said feedback circuit being connected across said inductive load.

4. A magnetic amplifier, comprising; a saturable magnetic core; a gating circuit adapted to drive said core toward saturation; said gating circuit comprising a gating winding inductively disposed upon said core and serially connected with a rectifier and means providing a first source of alternating voltage; a reset circuit adapted to drive said core away from saturation; said reset circuit comprising a reset winding inductively disposed upon said core and serially connected with a rectifier and means providing a second source of alternating voltage; signal means for blocking said reset circuit from driving said core away from saturation; means connecting an inductive load to said gating circuit; a feedback circuit for said magnetic amplifier being operative to cooperatively control the flux in said core only in response to current flow from energy storage in said inductive load; said feedback circuit being connected across said inductive load.

5. A magnetic amplifier, comprising; a saturable magnetic core; a gating circuit adapted to drive said core toward saturation; said gating circuit comprising a gating winding inductively disposed upon said core and serially connected with a rectifier and means providing a first source of alternating voltage; a reset circuit adapted to drive said core away from saturation; said reset circuit comprising a series circuit combination of a reset winding inductively disposed upon said core, a rectifier, a non-linear resistance circuit, and means providing a second source of alternating voltage; means connecting an inductive load to said gating circuit; a feedback circuit for said magnetic amplifier being operative to cooperatively control the flux in said core only in response to current flow from energy storage in said inductive load; said feedback circuit being connected across said inductive load.

6. A magnetic amplifier, comprising; a saturable magnetic core; a gating circuit adapted to drive said core toward saturation; said gating circuit comprising a gating winding inductively disposed upon said core and serially connected with a rectifier and means providing a first source of alternating voltage; a reset circuit adapted to drive said core away from saturation; said reset circuit comprising a series circuit combination of a reset winding inductively disposed upon said core, a rectifier, a non-linear resistance circuit, and means providing a second source of alternating voltage; circuit means including a rectifier for applying an input signal across said non-linear resistance means; means connecting an inductive load to said gating circuit; a feedback circuit for said magnetic amplifier being operative to cooperatively control the flux in said core only in response to current flow from energy storage in said inductive load; said feedback circuit being connected across said inductive load.

7. A magnetic amplifier, comprising; a saturable magnetic core; a gating circuit adapted to drive said core toward saturation; said gating circuit comprising a gating winding inductively disposed upon said core and serially connected with a rectifier and means providing a first source of alternating voltage; a reset circuit adapted to drive said core away from saturation; said reset circuit comprising a series circuit combination of a reset winding inductively disposed upon said core, a rectifier, a non-linear resistance circuit, and means providing a second source of alternating voltage; circuit means including a rectifier for applying an input signal across said non-linear resistance means; means connecting an inductive load to said gating circuit; a feedback circuit for said magnetic amplifier being operative to cooperatively control the flux in said core only in response to current flow from energy storage in said inductive load; said feedback circuit being connected across said inductive load; said feedback circuit comprising a feedback winding inductively disposed on said core serially connected with a rectifier.

References Cited in the file of this patent

UNITED STATES PATENTS

| | | |
|---|---|---|
| 2,757,297 | Evans et al. | July 31, 1956 |
| 2,770,737 | Ramey | Nov. 13, 1956 |
| 2,809,348 | Kellogg et al. | Oct. 8, 1957 |
| 2,816,260 | Scorgie | Dec. 10, 1957 |
| 2,842,730 | Osborn et al. | July 8, 1958 |